2,977,531

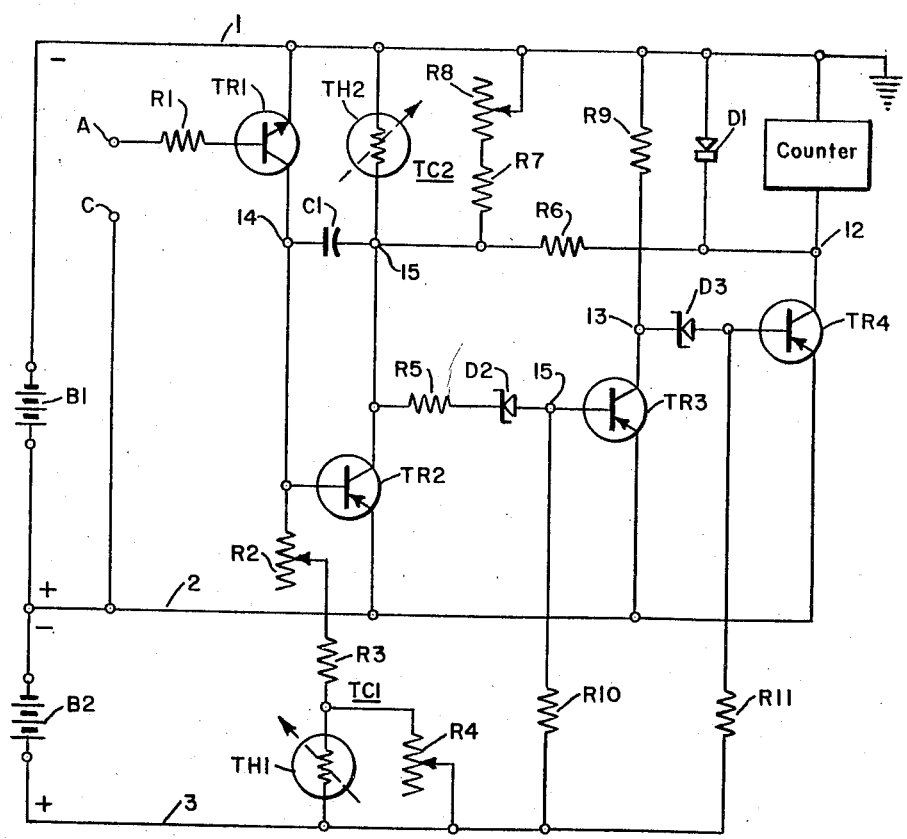

INSULATION TEST CIRCUIT

Karl R. Humes, Buffalo, Joseph G. Schwarckopf, Eggertsville, and Frederick H. Rohr, Buffalo, N.Y., and Marshall P. White, Grand Haven, Mich., assignors to Westinghouse Electric Corporation, East Pittsburgh, Pa., a corporation of Pennsylvania Filed Nov. 18, 1958, Ser. No. 774,673

3 Claims. (Cl. 324—54)

This invention relates to temperature compensated transistor amplifier circuitry for detecting insulating defects of electric insulators.

Insulation defect detectors of electric insulators are well known in the prior art, but those known in the prior art are complicated, expensive, lack in sensitivity, and require a high voltage that presents a fire hazard, and frequently operate destructively on the test piece.

One broad object of this invention is the provision of an insulation tester that has adequate sensitivity at low voltage to thus not act destructively on the test piece nor present a fire hazard the use of a high voltage would present.

Another broad object of this invention is the provision of highly sensitive yet reliable temperature compensated transistor amplifier circuitry for detecting electric insulation defects in electric insulating material.

The objects recited are merely illustrative. Other objects and advantages will become more apparent from a study of the following more detailed description of the invention, and a study of the accompanying diagrammatic showing of one embodiment of this invention.

In the diagrammatic showing the low constant voltage battery B1 is shown connected across leads 1 and 2, with the negative terminal being connected to the first conductor or lead 1 and the positive terminal being connected to the second conductor or lead 2.

The battery B2 is also a low constant voltage battery and has its negative terminal connected to lead 2 and its positive terminal connected to a third lead 3. The respective voltage values of the batteries B1 and B2 will be determined by the parameters of the circuit elements of the rest of the circuitry.

In testing an insulator for defects the terminals or probes A and C are connected across the insulator. If an insulation defect appears across probes A and C a very small current flows across the probes. The first transistor TR1 is thus caused to conduct. Conduction of transistor TR1 so changes the bias on the second transistor TR2 that this transistor TR2 also conducts. Adjustable resistors R2 and R4 and resistor R3 and the thermistor TH1 comprising a first temperature compensating impedance TC1 act together to bias the first transistor TR1 at any selected point. Similarly adjustable resistor R8 and fixed resistor R7, in conjunction with thermistor TH2, together comprising a second temperature compensating impedance TC2, act to bias the second transistor TR2 at any selected point. Since the thermistors have negative temperature coefficients automatic temperature compensation is provided for the transistors TR1 and TR2 so that an increase in bias change at probes A and C is not required with changes in temperature to effect conduction of the transistors TR1 and TR2 upon occurrence of a defect in the insulation disposed between probes A and C. Capacitor C1, connected between the first and second junctions 14 and 15 merely filters out any voltage surges that may occur for any cause. Voltage surges thus do not affect the operation of the system.

When transistor TR2 conducts the potential at junction 14 is raised cutting off the third transistor TR3. When transistor TR3 begins to cut off the potential at the third junction 13 is lowered and the fourth transistor TR4 begins to conduct. When this happens the potential at the fourth junction 12 is raised cutting off transistor TR3 even more since less current would flow through resistor R6. This action accelerates the conduction of transistor TR4 and together with the breakdown diodes D2 and D3 creates a snap action.

The transistor TR4 is connected in series with the counter shown, which counter is actuated when transistor TR4 conducts. This counter may include a signal as a bell or light and may include a marker which marks the place on the insulation where the insulation defect occurs. This is of particular value in a continuous process where an enameled metal strip, or insulated wire, or other insulated elongated member, continuously passes between the probes A and C.

Resistors R10 and R11 fix the bias for transistors TR3 and TR4 and diode D1 protects transistor TR4 from the inductive voltage surges that the counter may produce.

One of the probes, as C, may be connected to the machine tower and thus connects the metal, or conductor, portion of the strip or wire being investigated to the probe C. The other probe may be connected to a wet sponge through which the strip, or wire, passes. Further, a number of wires, or strips, may pass through the sponge simultaneously with as many insulation testing circuits used as there are voltages for which the circuitry is caused to conduct. Or a single strand, or wire, or strip may be investigated for 10,000 volts, 100,000 volts, or 500,000 volts.

From the foregoing it is apparent that a highly sensitive insulation defect detector is provided that is temperature compensated, uses a low voltage, is non-destructive of the test piece, and acts positively with a snap action. Further, the energy output is sufficient at transistor TR4 to actuate the counter directly.

The fact that the foregoing disclosure is directed to one embodiment does not mean that the invention is so limited. It is apparent to those skilled in the art, particularly after a study of the single embodiment disclosed, that other modifications thereof may be devised falling within the spirit and scope of this invention.

We claim as our invention:

1. In an electric system of circuitry for detecting insulation defects in electric insulating materials, in combination, a first conductor, a second conductor, and a third conductor, said first and second conductors being energized with a relatively low constant voltage direct current energy, and the second and third conductors being energized with a relatively low constant voltage direct current energy, a first transistor having an emitter, a base, and a collector, first temperature compensating impedance means, a first series circuit, including the first transistor, a first junction, and the first temperature compensating impedance means, connected across the third and first conductors, a second transistor, second temperature compensating means, a second series circuit, including the second temperature compensating means, a second junction, and the second transistor, connected across the first and second conductors, with the base of the second transistor being connected to the first junction, an impedance having one of its terminals connected to the base of the first transistor and its other terminal connected to a probe terminal, a second probe terminal connected to said second conductor, said probe terminals in use being connected across the insulating material being investigated for defects, the defects acting to cause conduction of said transistors, a load unit, and snap acting transistor circuitry responsive to the conduction of the second transistor for effecting operation of said load unit.

2. In electric circuitry for detecting insulation defects of electric insulators, in combination, three conductors with the first conductor energized with a relatively low negative voltage with respect to the second and the second conductor negatively energized at a relatively low voltage with respect to the third, a first transistor having an emitter, a collector, and a base, a resistor, a first probe in use connected to one side of the insulator to be tested and connected to the second conductor, a second probe in use connected to the other side of the insulator to be tested and connected through the resistor to the base, a first adjustable temperature compensating circuit, including adjustable resistors, fixed resistors, and a thermistor, connecting the collector of the first transistor to the third conductor, the emitter of said transistor being connected to the first conductor, a second transistor, a second temperature compensating circuit, said second temperature compensating circuit connecting the collector of the second transistor to the first conductor, the base of the second transistor being connected to the collector of the first transistor and the emitter of the second transistor being connected to the second conductor, the parameters of the elements recited being so chosen that a small current flowing between the probes causes the conduction of both transistors, and a transistor flip-flop circuit caused to flop to one stable state when the second transistor conducts and to flip to a second stable state when the second transistor is not conducting, and means for counting the number of first stable states of operation.

3. In electric circuitry for detecting insulation defects of electric insulators, in combination, three conductors being with the first conductor energized with a relatively low negative voltage with respect to the second and the second conductor negatively energized at a relatively low voltage with respect to the third, a first transistor having an emitter, a collector, and a base, a resistor, a first probe in use connected to one side of the insulator being tested and connected to the second conductor, a second probe in use connected to the other side of the insulator being tested and connected through the resistor to the base, a first adjustable temperature compensating circuit, including adjustable resistors, fixed resistors, and a thermistor, connecting the collector of the first transistor to the third conductor, the emitter of said transistor being connected to the first conductor, a second transistor, a second temperature compensating circuit somewhat similar to the first, said second temperature compensating circuit connecting the collector of the second transistor to the first conductor, the base of the second transistor being connected to the collector of the first transistor and the emitter of the second transistor being connected to the second conductor, the parameters of the elements recited being so chosen that a small current flowing between the probes causes the conduction of both transistors, and a transistor flip-flop circuit caused to flop to one stable state when the second transistor conducts and to flip to a second stable state when the second transistor is not conducting, and means interconnected with the output of the transistor flip-flop circuit for indicating each time a current flows between the probes.

References Cited in the file of this patent

UNITED STATES PATENTS

| | | |
|---|---|---|
| 2,848,564 | Keonjian | Aug. 19, 1958 |
| 2,901,740 | Artsogeorge | Aug. 25, 1959 |
| 2,945,133 | Pinckaers | July 12, 1960 |

OTHER REFERENCES

"Principles of Transistor Circuits," R. F. Shea, John Wiley & Sons, Inc., New York, 1953, 7th Printing, December 1957, pp. 178, 179, and 289.